(12) United States Patent
Bastide et al.

(10) Patent No.: US 10,348,666 B2
(45) Date of Patent: Jul. 9, 2019

(54) MESSAGE PROCESSING

(71) Applicant: International Business Machines Corporation, Armonk, NY (US)

(72) Inventors: Paul R. Bastide, Boxford, MA (US); Matthew E. Broomhall, Goffstown, NH (US); Robert E. Loredo, North Miami Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 235 days.

(21) Appl. No.: 15/193,666

(22) Filed: Jun. 27, 2016

(65) Prior Publication Data

US 2017/0374011 A1 Dec. 28, 2017

(51) Int. Cl.
G06F 15/16 (2006.01)
H04L 12/58 (2006.01)
H04L 29/08 (2006.01)

(52) U.S. Cl.
CPC .............. H04L 51/18 (2013.01); H04L 51/02 (2013.01); H04L 67/22 (2013.01)

(58) Field of Classification Search
CPC ......... H04L 51/02; H04L 51/34; H04L 51/18; H04L 67/22
See application file for complete search history.

(56) References Cited

U.S. PATENT DOCUMENTS

| | | | |
|---|---|---|---|
| 6,760,753 B1 * | 7/2004 | Ohgushi | G06Q 10/107 709/206 |
| 6,925,605 B2 | 8/2005 | Bates et al. | |
| 7,136,710 B1 | 11/2006 | Hoffberg et al. | |
| 7,844,666 B2 | 11/2010 | Horvitz et al. | |
| 7,904,399 B2 | 3/2011 | Subramaniam et al. | |
| 7,933,961 B2 | 4/2011 | Mandel et al. | |
| 8,943,134 B2 | 1/2015 | Reis et al. | |

(Continued)

OTHER PUBLICATIONS

Disclosed Anonymously et al., "System for Managing authored content over time taking into account specified individuals", An IP.com Prior Art Database Technical Disclosure, IP.com No. IPCOM000229387D, IP.com Electronic Publication Date: Jul. 26, 2013, 4 pages.

(Continued)

*Primary Examiner* — Jonathan A Bui
(74) *Attorney, Agent, or Firm* — Gilbert Harmon, Jr.

(57) ABSTRACT

A method includes receiving a set of messages corresponding to a user, identifying a non-terminal message from the received set of messages, wherein a non-terminal message is a message containing content that indicates further action is required, determining if an age of the identified non-terminal message is greater than a selected threshold, wherein the age of the identified non-terminal message corresponds to an amount of time elapsed since the message was received, identifying actionable content corresponding to the non-terminal message, wherein actionable content corresponds to message content that requests or indicates a need for further action, determining one or more next actions according to the identified actionable contents, and executing the determined one or more actions. A computer program product and computer system corresponding to the method are also disclosed.

15 Claims, 4 Drawing Sheets

(56) References Cited

U.S. PATENT DOCUMENTS

| | | | |
|---|---|---|---|
| 8,949,357 B2 | 2/2015 | Bradshaw | |
| 9,177,065 B1 | 11/2015 | Ben-Yair et al. | |
| 9,223,835 B1 | 12/2015 | Mazniker et al. | |
| 2003/0018724 A1* | 1/2003 | Mathewson, II | G06Q 10/107 709/206 |
| 2003/0139902 A1 | 7/2003 | Geib et al. | |
| 2010/0121849 A1 | 5/2010 | Goeldi | |
| 2010/0318624 A1* | 12/2010 | Pattan | G06Q 10/109 709/207 |
| 2013/0018955 A1 | 1/2013 | Thaxton et al. | |
| 2014/0006400 A1 | 1/2014 | Bastide et al. | |
| 2014/0052540 A1 | 2/2014 | Rajaram et al. | |
| 2014/0280890 A1 | 9/2014 | Yi et al. | |
| 2015/0120717 A1 | 4/2015 | Kim et al. | |
| 2015/0269155 A1 | 9/2015 | Bastide et al. | |
| 2015/0312731 A1* | 10/2015 | Bendi | H04W 4/12 455/414.1 |
| 2015/0347596 A1 | 12/2015 | Mandel et al. | |
| 2015/0381555 A1 | 12/2015 | Faller et al. | |
| 2016/0156774 A1* | 6/2016 | Campbell | H04M 1/72522 455/418 |
| 2016/0294757 A1* | 10/2016 | Wang | H04L 51/18 |
| 2017/0004396 A1* | 1/2017 | Ghotbi | G06F 3/04842 |
| 2017/0324695 A1* | 11/2017 | Fischer | H04L 51/18 |
| 2018/0026923 A1* | 1/2018 | Cho | H04L 51/046 |

OTHER PUBLICATIONS

IBM Knowledge Center, "What do I need to know about using IBM Verse for Apple devices?", printed on Apr. 14, 2016, 1 page, <https://www.ibm.com/support/knowledgecenter/SSYRPW_9.0.1/iOSVerseNeedtoKNow.dita>.

Reed, Frank, "Facbook Looks to Improve News Feed Content Quality", Marketing Pilgrim, © 2005-2015 Marketing Pilgrim, posted, Aug. 26, 2013, 4 pages, <http://www.marketingpilgrim.com/2013/08/facebook-looks-to-improve-news-feed-content-quality.html>.

"Deep learning", From Wikipedia, the free encyclopedia, This page was last modified on Apr. 10, 2016, 18 pages, <https://en.wikipedia.org/wiki/Deep_learning>.

"Facebook Launches Advanced AI Effort to Find Meaning in Your Posts", posted by Timothy on Saturday Sep. 21, 2013, Copyright © 2016 SlashdotMedia, 11 pages, <https://tech.slashdot.org/story/13/09/21/1831239/facebook-launches-advanced-ai-effort-to-find-meaning-in-your-posts>.

"Release Blueprints", printed on Apr. 14, 2016, 1 page, <https://releaseblueprints.ibm.com/login.action?os_destination=/display/SFSB/Mail+Next>.

"SaneBox for Business", © Copyright 2016 SaneBox, Inc., 4 pages, <https://www.sanebox.com/business>.

"SocialMediaToday", © 2016 socialmediatoday.com, 4 pages, <https://www.sanebox.com/business>.

* cited by examiner

MESSAGE PROCESSING

BACKGROUND OF THE INVENTION

The present invention relates generally to the field of online messaging, and more specifically to automatically identifying and executing appropriate responses to messages.

Mail clients and online social networks are universal mechanisms for connecting people and information in logical and organized ways that enable sharing and processing of information between the users. Common mechanisms for sharing and processing information are inboxes, walls, activity streams, timelines, and profiles. These mechanisms enable a user to rapidly share information with others, as well as gather information from other users within a network.

SUMMARY

As disclosed herein, a method includes receiving a set of messages corresponding to a user, identifying a non-terminal message from the received set of messages, wherein a non-terminal message is a message containing content that indicates further action is required, determining if an age of the identified non-terminal message is greater than a selected threshold, wherein the age of the identified non-terminal message corresponds to an amount of time elapsed since the message was received, identifying actionable content corresponding to the non-terminal message, wherein actionable content corresponds to message content that requests or indicates a need for further action, determining one or more next actions according to the identified actionable contents, and executing the determined one or more actions. A computer program product and computer system corresponding to the method are also disclosed.

DETAILED DESCRIPTION

Information sharing can often be unpredictable, and may result in a seesawing between checking email statuses, answering new emails, and getting back to work that must be completed. Amidst this back and forth, messages can get lost or go unanswered for long periods of time, and the original purpose of these messages can go unrealized. There exists a need to automatically generate responses to messages for which it has been deemed unlikely the user will respond himself.

Figure 1:
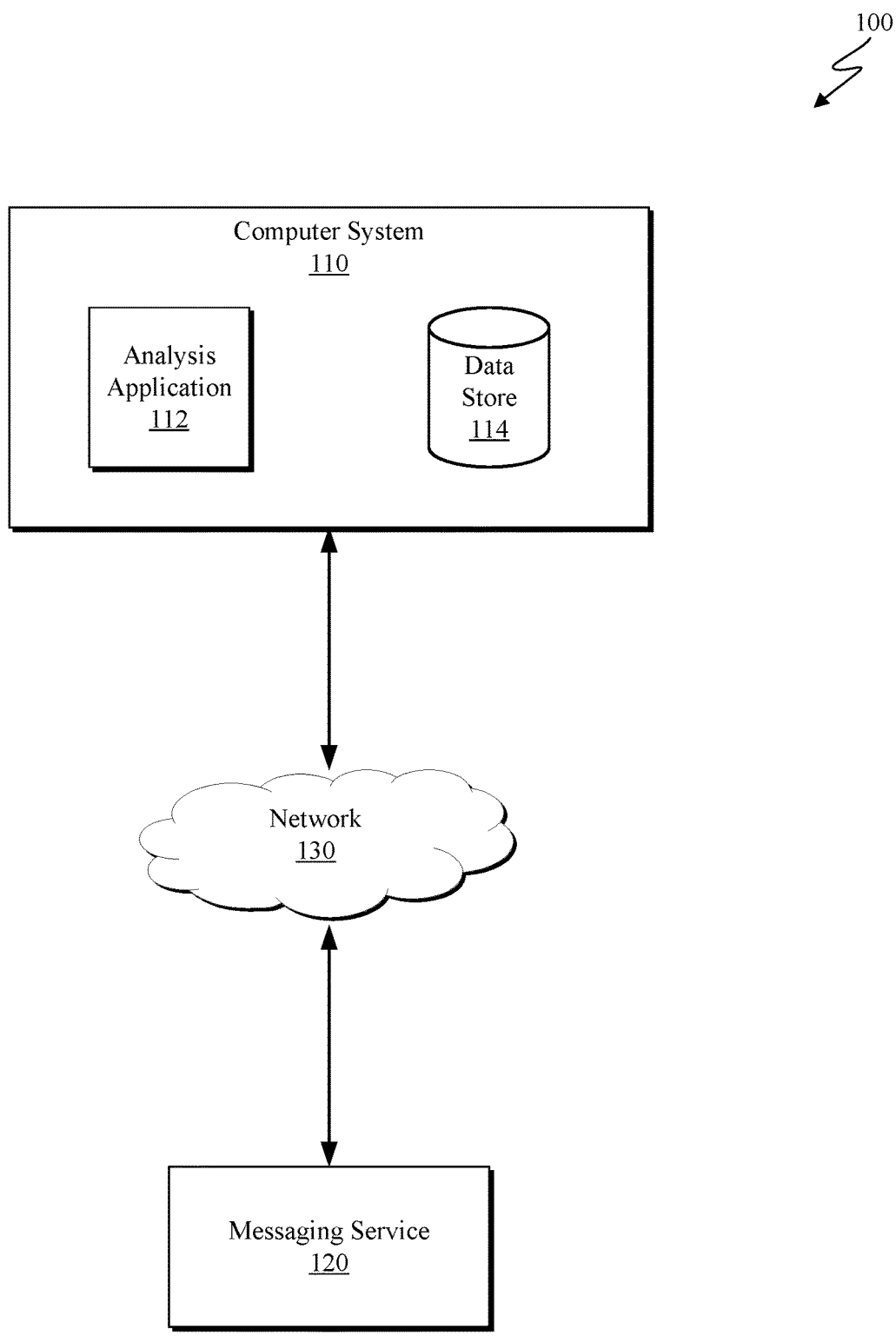
FIG. 1 is a block diagram depicting one embodiment of a social networking system in accordance with some embodiments of the present invention.

FIG. 1 is a block diagram depicting one embodiment of a message analysis system 100 in accordance with some embodiments of the present invention. As depicted, message analysis system 100 includes computer system 110, messaging service 120, and network 130. Message analysis system 100 may enable content analysis with respect to a user's inbox.

Computer system 110 can be a desktop computer, a laptop computer, a specialized computer server, or any other computer system known in the art. In some embodiments, computer system 110 represents a computer system utilizing clustered computers and components to act as a single pool of seamless resources. In general, computer system 110 is representative of any electronic device, or combination of electronic devices, capable of executing machine-readable program instructions, as described in greater detail with regard to FIG. 4.

As depicted, computer system 110 includes analysis application 112 and data store 116. Analysis application 112 may be configured to receive a set of messages and message information from messaging service 120 via network 130. In one or more embodiments, analysis application 112 is configured to execute a content analysis method on the received set of messages. One example of an appropriate message analysis method is described with respect to FIG. 2.

Data store 116 may be configured to store message information associated with the received set of messages. Data store 116 may be any non-volatile storage media known in the art. For example, data store 116 can be implemented with a tape library, optical library, one or more independent hard disk drives, or multiple hard disk drives in a redundant array of independent disks (RAID). Similarly, data on data store 116 may conform to any suitable storage architecture known in the art, such as a file, a relational database, an element-oriented database, and/or one or more tables.

Messaging service 120 may be any service through which a user can send and receive messages. Messaging service 120 may correspond to an email service, a chat service, an instant messaging service, or a social networking service. In one or more embodiments, a user's messages hosted by messaging service 120 are available to the user through an inbox interface. The inbox interface may be hosted on the computer system 110, or may be hosted on messaging service 120 and accessible via a web browser on computer system 110.

Figure 2:
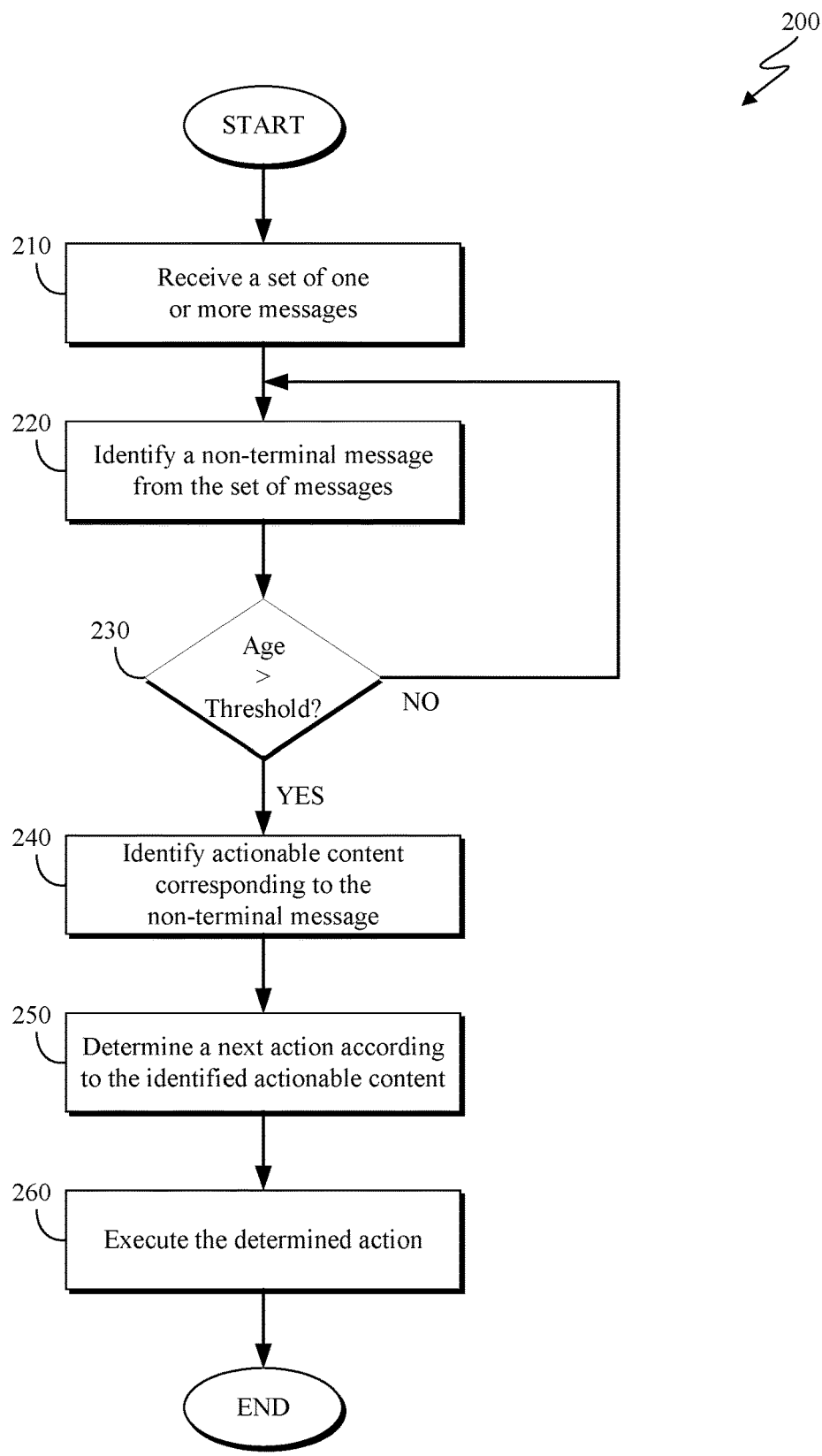
FIG. 2 is a flowchart depicting one embodiment of a content analysis method in accordance with at least one embodiment of the present invention.

FIG. 2 is a flowchart depicting one example of a message analysis method 200 in accordance with at least one embodiment of the present invention. As depicted, message analysis method 200 includes receiving (210) a set of one or more messages, identifying (220) a non-terminal message, determining (230) if the age of the message is greater than a selected threshold, identifying (240) actionable content corresponding to the non-terminal message, determining (250) a next action according to the identified change, and executing (260) the determined action. Message analysis method 200 may enable messages that have been unanswered to be addressed automatically.

Receiving (210) a set of one or more messages may include receiving one or more emails or messages corresponding to a user's inbox. The set of messages may include a mix of messages that have been replied to, messages that require no further action, and messages that require attention. Additionally, the set of messages may include messages from a selected time window (e.g., a week, a month, etc.).

Identifying (220) a non-terminal message may include analyzing the received set of messages to identify a message that has reached a terminal state. A message may be referred to as terminal if it is determined that there is no further action necessary based on the contents of the message. In one or more embodiments, determining if a message is terminal includes determining if the message includes one or more phrases or expressions that have been previously determined to indicate a likely terminal state. For example, if a message contains the phrase: "That worked, thanks", the message is likely terminal, as this phrase indicates a sender has likely received the solution he requested. In some embodiments, a dictionary of terminal phrases is created and consulted to determine whether a message's contents indicate the message is terminal. Identifying (220) a non-terminal message may include analyzing the messages one at a time until a non-terminal message is identified.

Determining (230) if the age of the identified message is greater than a selected threshold may include comparing the age of the identified non-terminal message to a selected threshold. In one or more embodiments, the selected threshold corresponds to an age indicated by the user at which point an automatic reply to a message should be generated. For example, a user may decide that if an email has been unanswered for longer than 72 hours, then he is unlikely to respond to the email himself, and would therefore select 72 hours as the threshold. In another embodiment, the selected threshold is calculated according to an average user response time. If the age of the identified message is greater than the selected threshold (230, yes branch), the method continues by identifying (240) a change in conversation corresponding to the non-terminal message. If the age of the identified message is less than the selected threshold (230, no branch), the method continues by analyzing the set of messages to identify a non-terminal message.

Identifying (240) actionable content corresponding to the non-terminal message may include analyzing the non-terminal message to identify content that requires further action. The identified actionable content may correspond to a question or inquiry posed within the non-terminal message. In some embodiments, the identified actionable content may correspond to an unconfirmed plan. For example, if a message includes the text "OK, I'll ask Frank to take a look at that and get back to you", but no follow up message has been received, this content may be identified as the actionable content. While it is not a question or inquiry, it is an indication that further action will occur, and a reminder may be necessary since the action has yet to occur. The identified actionable content may correspond to an important date or deadline referenced in the message.

Determining (250) a next action according to the identified actionable content may include identifying an appropriate action to address a need associated with the identified actionable content. For example, if the identified actionable content is a question, the determined next action may be to draft a response email to the sender containing the answer to the question. The response email may be drafted and presented to the user to complete and send. In some embodiments, if the answer to the question is easily searchable, the response email is drafted and sent without any input from the user. For example, if the message is a request for an individual's contact information, and said individual's contact information is in the user's address book, the application will populate the draft email with the appropriate contact information and send the email. If the actionable content of the conversation is an important date or a deadline, the determined next action may be a reminder to the user of said important date. In some embodiments, it may be determined that an additional individual should be involved in the conversation. In said embodiments, the application generates a draft follow up email to the original sender as well as the identified additional individual. If a precise response action is not apparent, the application may prompt the user with a dialog requiring acknowledgement that the message still requires attention.

Executing (260) the determined action may include carrying out the action(s) as determined in step 250. Executing (260) the determined action may include drafting an email, sending a draft email, providing a reminder, introducing a new individual to a message thread, or prompting the user to acknowledge the message according to the action determined in step 250.

Figure 3A:
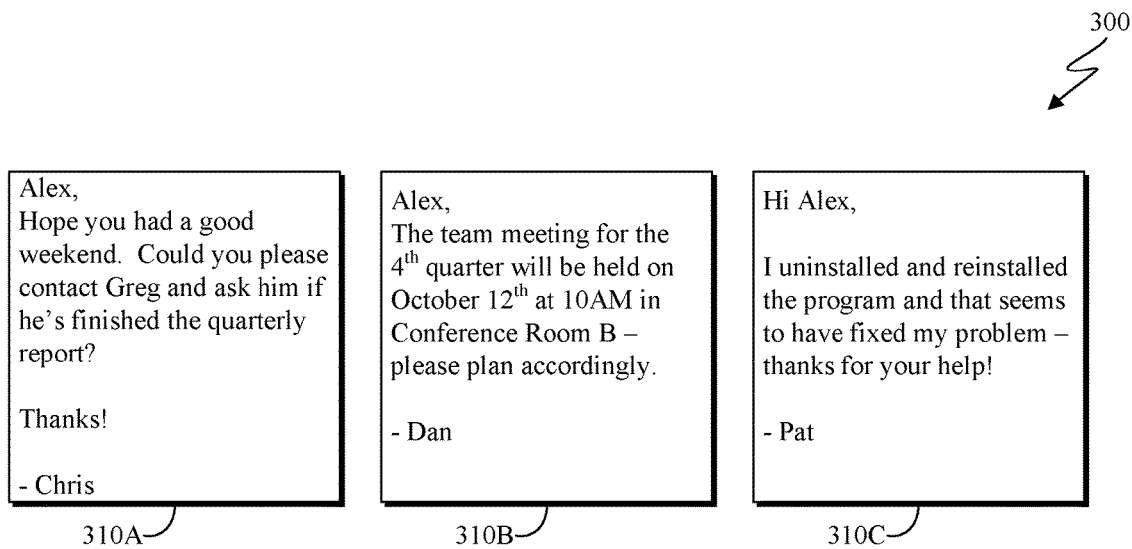
FIG. 3A depicts an example set of messages in accordance with at least one embodiment of the present invention.

FIG. 3A depicts an example set of messages 300 in accordance with one embodiment of the present invention. As depicted, the set of messages 300 includes three emails 310 from a user's inbox. The emails 310 correspond to messages that can be analyzed and automatically responded to via a message processing method such as message processing method 200 discussed with respect to FIG. 2.

Each of emails 310 corresponds to a different message type requiring a different generated response. Email 310A depicts a message wherein a sender asks the user a question. The question content is easily identifiable as the text preceding the question mark in the email. Email 310A is therefore designated as a message for which a response needs to be generated. Email 310B depicts a message containing an event notification. The event details correspond to a date, time, location, and event description as indicated by the sender. Email 310B is therefore designated as a message for which an event reminder needs to be generated. In other embodiments, email 310B could be designated as a message for which a calendar entry needs to be created. Email 310C depicts a message containing no information that requires further action. The message corresponds to an acknowledgement of a previous email, and includes no content requiring additional action. Email 310C is therefore designated as a terminal message, and no response is generated.

Figure 3B:
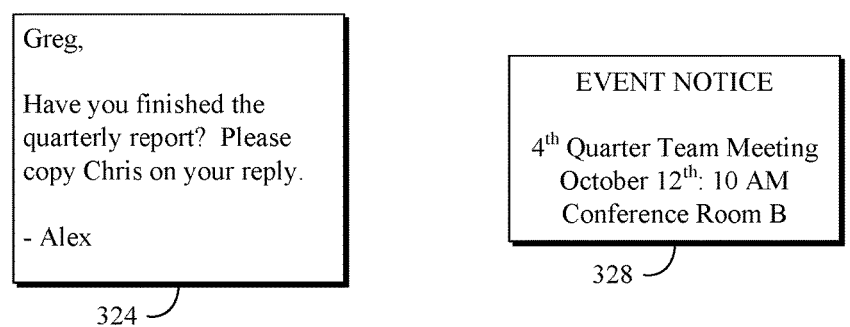
FIG. 3B depicts an example of a set of generated responses in accordance with at least one embodiment of the present invention.

FIG. 3B depicts an example of a set of generated responses 320 corresponding to the set of messages 300 depicted with respect to FIG. 3A. As depicted, the set of generated responses 320 includes a generated email 324 and an event notice 328. The set of generated responses 320 may correspond to responses generated by a message processing method such as method processing method 200 discussed with respect to FIG. 2.

Generated email 324 is an email generated in response to email 310A depicted in FIG. 3A. Generated email 324 is an example of an email created according to a template in response to an email containing a question for the user. In the depicted embodiment, generated email 324 is created according to a template which is configured to include the content of the sender's question. The generated email 324 also includes a request to include the sender of email 310A on a response email. Generated email 324 may be sent directly to the appropriate recipient, or may be provided to the user as a draft to edit and send.

Event notice 328 is a reminder generated in response to email 310B depicted in FIG. 3B. Event notice 328 is an example of a reminder created according to a template in response to an email containing event details. In the depicted embodiment, event notice 328 is created according to a template which is configured to include an indicated date, time, and even title when applicable. Event notice 328 may be displayed to the user upon creation. In some embodiments, event notice 328 is added to the user's calendar.

Figure 4:
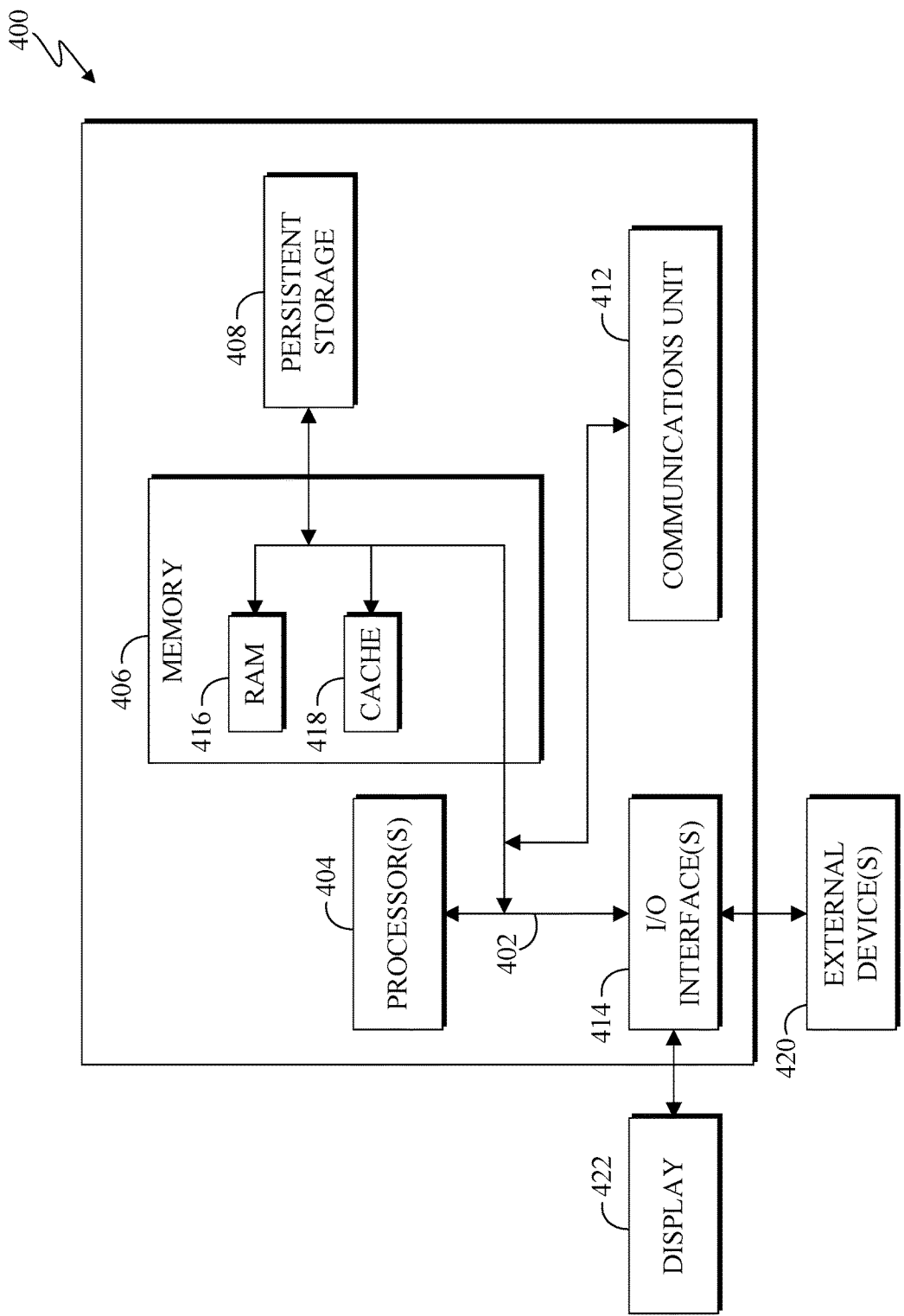
FIG. 4 depicts a block diagram of components of a computer, in accordance with some embodiments of the present invention.

FIG. 4 depicts a block diagram of components of computer 400 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

As depicted, the computer 400 includes communications fabric 402, which provides communications between computer processor(s) 404, memory 406, persistent storage 408, communications unit 412, and input/output (I/O) interface(s) 414. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 416 and cache memory 418. In general, memory 406 can include any suitable volatile or non-volatile computer-readable storage media.

One or more programs may be stored in persistent storage 408 for access and/or execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 412, in these examples, provides for communications with other data processing systems or devices. In these examples, communications unit 412 includes one or more network interface cards. Communications unit 412 may provide communications through the use of either or both physical and wireless communications links.

I/O interface(s) 414 allows for input and output of data with other devices that may be connected to computer 400. For example, I/O interface 414 may provide a connection to external devices 420 such as a keyboard, keypad, a touch screen, and/or some other suitable input device. External devices 420 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 408 via I/O interface(s) 414. I/O interface(s) 414 also connect to a display 422.

Display 422 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
   receiving a set of messages corresponding to a user;
   identifying a non-terminal message from the received set of messages, wherein a non-terminal message is a message containing content that indicates further action is required;
   determining if an age of the identified non-terminal message is greater than a selected threshold, wherein the age of the identified non-terminal message corresponds to an amount of time elapsed since the identified non-terminal message was received;
   identifying actionable content corresponding to the non-terminal message when the age of the identified non-terminal is determined to be greater than the selected threshold, wherein actionable content corresponds to message content that requests or indicates a need for a further action;
   generating a reply to a message that satisfies the further action indicated by the non-terminal message; and
   sending the generated reply corresponding to the non-terminal message without requiring a user action.

2. The method of claim 1, wherein the selected threshold corresponds to a user selected age at which a message will be analyzed.

3. The method of claim 1, further comprising calculating an average age for messages to which the user has responded.

4. The method of claim 3, wherein the selected threshold corresponds to the calculated average age for messages to which the user has responded.

5. The method of claim 1, wherein the set of messages corresponds to one or more messages from the user's inbox.

6. The method of claim 1, wherein identifying actionable content corresponding to the non-terminal message further comprises generating an event reminder corresponding to the actionable content.

7. A computer program product comprising: one or more computer readable storage media and program instructions stored on the one or more computer readable storage media, the program instructions comprising instructions to:
   receive a set of messages corresponding to a user;
   identify a non-terminal message from the set of messages, wherein a non-terminal message is a message containing content that indicates further action is required;
   determine if an age of the identified non-terminal message is greater than a selected threshold, wherein the age of the identified non-terminal message corresponds to an amount of time elapsed since the identified non-terminal message was received;
   identify actionable content corresponding to the non-terminal message when the age of the identified non-terminal is determined to be greater than the selected threshold, wherein actionable content corresponds to message content that requests or indicates a need for a further action;
   generate a reply to a message that satisfies the further action indicated by the non-terminal message; and send the generated reply corresponding to the non-terminal message without requiring a user action.

8. The computer program product of claim 7, wherein the selected threshold corresponds to a user selected age at which a message will be analyzed.

9. The computer program product of claim 7, further comprising instructions to calculate an average age for messages to which the user has responded.

10. The computer program product of claim 9, wherein the selected threshold corresponds to the calculated average age for messages to which the user has responded.

11. The computer program product of claim 7, wherein the set of messages corresponds to one or more messages from the user's inbox.

12. The computer program product of claim 7, wherein instructions to identify actionable content corresponding to the non-terminal message further comprise instructions to generate an event reminder corresponding to the actionable content.

13. A computer system comprising:
one or more computer processors;
one or more computer-readable storage media; program instructions stored on the computer-readable storage media for execution by at least one of the one or more processors, the program instructions comprising instructions to:

receive a set of messages corresponding to a user;
identify a non-terminal message from the set of messages, wherein a non-terminal message is a message containing content that indicates further action is required;
determine if an age of the identified non-terminal message is greater than a selected threshold, wherein the age of the identified non-terminal message corresponds to an amount of time elapsed since the identified non-terminal message was received;
identify actionable content corresponding to the non-terminal message when the age of the identified non-terminal is determined to be greater than the selected threshold, wherein actionable content corresponds to message content that requests or indicates a need for a further action;
generate a reply to a message that satisfies the further action indicated by the non-terminal message; and
send the generated reply corresponding to the non-terminal message without requiring a user action.

14. The computer system of claim 13, wherein the selected threshold corresponds to a user selected age at which a message will be analyzed.

15. The computer system of claim 13, further comprising instructions to calculate an average age for messages to which the user has responded.

* * * * *